United States Patent
Vigoureux et al.

(10) Patent No.: US 7,486,679 B2
(45) Date of Patent: Feb. 3, 2009

(54) DEVICE FOR LOCALLY CONTROLLING ONE OR MORE PARAMETERS OF A CONNECTION TO BE SET UP, FOR AN ELEMENT OF AN ETHERNET COMMUNICATIONS NETWORK WITH A GMPLS CONTROL PLAN

(75) Inventors: Martin Vigoureux, Paris (FR); Emmanuel Dotaro, Verrieres le Buisson (FR); Dimitri Papadimitriou, Brussels (BE)

(73) Assignee: Alcatel Lucent, Paris (FR)

( * ) Notice: Subject to any disclaimer, the term of this patent is extended or adjusted under 35 U.S.C. 154(b) by 633 days.

(21) Appl. No.: 11/247,146

(22) Filed: Oct. 12, 2005

(65) Prior Publication Data

US 2006/0087983 A1    Apr. 27, 2006

(30) Foreign Application Priority Data

Oct. 22, 2004    (FR)  ................................... 04 11315

(51) Int. Cl.
  *H04L 12/26* (2006.01)
  *H04L 12/28* (2006.01)
  *H04L 12/56* (2006.01)
(52) U.S. Cl. ................... 370/395.21; 370/236; 370/410; 709/228
(58) Field of Classification Search ................. 370/230, 370/231, 235, 236, 252, 395.2, 395.21, 395.5, 370/400, 410, 469; 709/225–229, 232–235
See application file for complete search history.

(56) References Cited

U.S. PATENT DOCUMENTS

2002/0110087 A1*  8/2002  Zelig et al. .................. 370/236
2007/0147427 A1*  6/2007  Berde et al. .................. 370/469

FOREIGN PATENT DOCUMENTS

EP    1 037 500 A    9/2000
WO    WO 00/65783 A    11/2000

OTHER PUBLICATIONS

Sharma V et al: "Estimating Traffic Parameters in Internet Via Active Measurements for QOs and Congestion Control." Globecom'01. 2001 IEEE Global Telecommunications Conference. San Antonio, TX, Nov. 25-29, 2001, IEEE Global Telecommunications Conference, New York, NY: IEEE, US, vol. vol. 4 of 6, Nov. 25, 2001, pp. 2527-2531, XP001060598.

* cited by examiner

Primary Examiner—Aung S. Moe
Assistant Examiner—Feben Haile

(57) ABSTRACT

A control device (D) for a node (LCR3) in an Ethernet communications network having a GMPLS control plan and through which node a connection for setting up is to pass, includes control means (MC) arranged, in the event of said node (LCR3) receiving a connection setup message containing at least one first value representative of the sum since the beginning of the connection for setting up of the local values of an additive parameter as introduced in each of the preceding nodes (LCR3) in the connection, to determine a second value that is a function of the first value and of the local value as introduced by the node (LCR3), and then to compare the second value with a selected threshold so as to determine whether the connection can accept a maximum value for the additive parameter at the node, and to replace the first value in the received message with the second value as determined, at least when the connection can accept the maximum value.

14 Claims, 1 Drawing Sheet

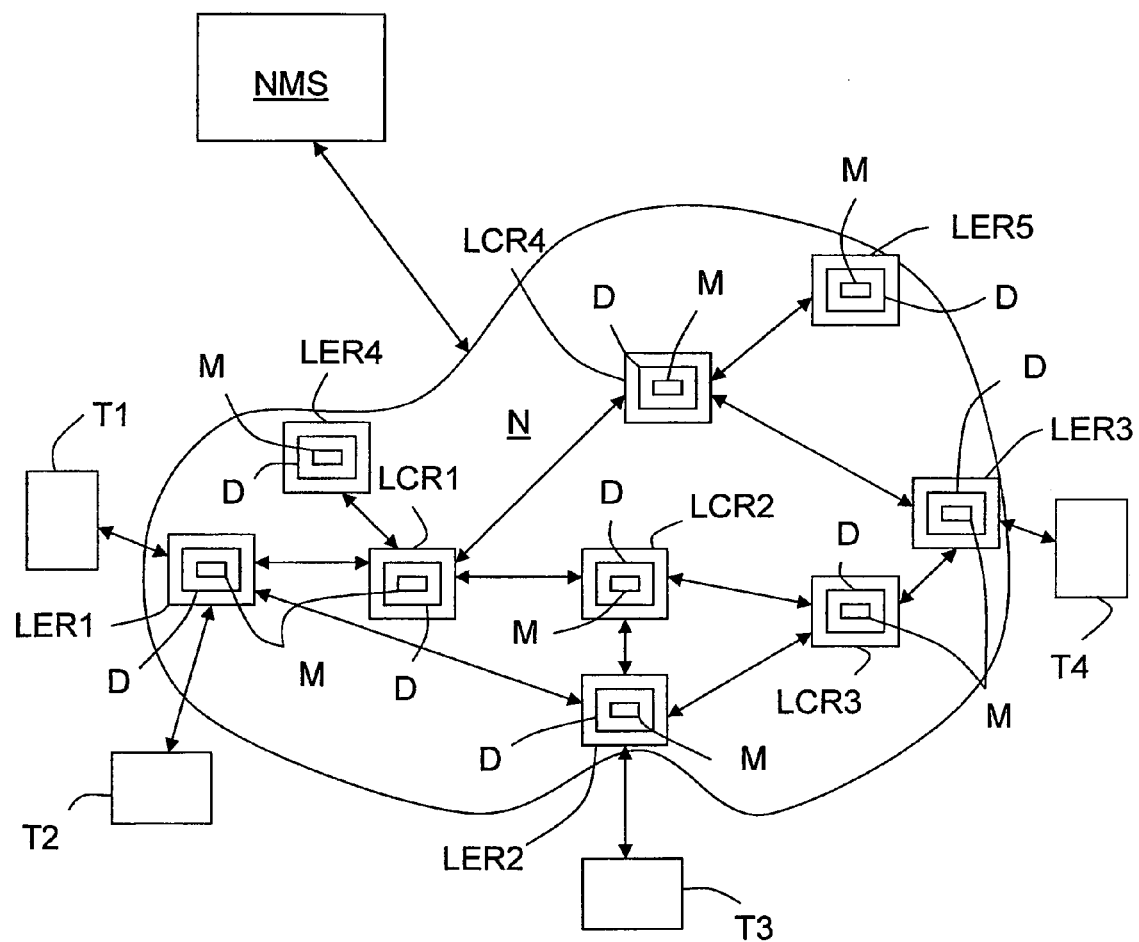
Sole figure

US 7,486,679 B2

DEVICE FOR LOCALLY CONTROLLING ONE OR MORE PARAMETERS OF A CONNECTION TO BE SET UP, FOR AN ELEMENT OF AN ETHERNET COMMUNICATIONS NETWORK WITH A GMPLS CONTROL PLAN

BACKGROUND OF THE INVENTION

The present invention relates to communications networks, and more particularly to controlling parameters of connections to be set up within such networks.

The term "connection" is used herein to mean a communications link defined by a connection path passing via an ordered sequence of network elements defining nodes, such as, for example, switches or routers.

As the person skilled in the art knows, a connection is generally defined, in addition to its connection path, by parameters having values that must lie within predefined ranges as a function of a service level agreement (SLA) between its user(s) and the network operator.

So long as the parameters of a connection remain within their respective ranges, the agreement is being complied with.

Nevertheless, in certain situations, a user may desire that one or more of the parameters of the connection that is to be used should not exceed a maximum value equal to the top limit of its predefined range. Such an option is made available in certain communications networks, such as those known as label switched networks, e.g. of the multiprotocol label switching (MPLS) type or the generalized MPLS (GMPLS) type.

More precisely, in networks of the above-specified type and in the context of the layer-2 label switched path (L2 LSP) type, proposals have been made to integrate each maximum value in an attribute, referred to as "SENDER_TSPEC", in the connection setup message that is transmitted from one node to another along a connection path. That type of integration is described in particular in the document "Generalized MPLS (GMPLS) RSVP-TE signaling in support of layer-2 label switched paths (L2 LSP)", by P. Papadimitriou et al., that is available on the Internet at the address http://www.ietf.org/internet-drafts/draft-papadimitriou-ccamp-gmpls-l2sc-lsp-02.txt.

Each network element defining a node on the connection path is arranged in such a manner as to verify whether it can individually satisfy the maximum values that are contained in each connection setup message. However, if a parameter is additive, such as transmission delay or jitter, such local verification does not make it possible to ensure that the parameter will be satisfied from one end of the connection to the other. Each node on a connection path can individually and locally satisfy some maximum value, but if the local values of an additive parameter as added by the various nodes along the connection path accumulate, then the maximum value can end up being exceeded.

Consequently, although the above-presented integration does indeed enable maximum values to be transmitted to the nodes along a connection path, the way in which the maximum values are used and the read-only restriction that is imposed on the objects of the SENDER_TSPEC attribute, mean that it is not possible to guarantee that the connection does in fact comply with the maximum parameter value(s) once it has been set up.

SUMMARY OF THE INVENTION

An object of the invention is thus to remedy the above-mentioned drawbacks in full or in part in Ethernet networks having a GMPLS control plan.

To this end, the invention provides a control device for a node of an Ethernet communications network having a GMPLS control plan and through which a connection for setting up is to pass, the device comprising control means serving, when the node receives a connection setup message containing at least a first value representative of the sum from the beginning of the connection that is for setting up of the local values of an additive parameter as introduced by each preceding node (on the connection path), to determine a second value that is a function of said first value and of the local value introduced by the node in question, and then to compare said second value with a selected threshold so as to determine whether the connection through the node in question can accept a maximum value of the additive parameter, and to replace the first value in the received message with the second value as determined, at least when the connection can accept the maximum value.

The device of the invention may include other characteristics that can be taken separately or in combination, and in particular:

when the connection cannot accept the maximum value, the control means may be arranged to generate an error message indicating that the connection to be set up cannot present the maximum value of the additive parameter;

the setup message may include a third value equal to the selected threshold, and the first value may be equal to the sum from the beginning of the connection that is to be set up of the local values of the additive parameter as introduced in each preceding node;

in which case the control means may be adapted to subtract the second value from the third value and to proceed with replacing the first value by the second value when the result of the subtraction is greater than or equal to zero;

the control means may be adapted to subtract the second value from the third value and to generate an error message when the result of the subtraction is less than zero;

in a variant, the threshold may be equal to zero and the first value may be equal to the result of subtracting the sum from the beginning of the connection that is to be set up of the local values of the additive parameter as introduced in each preceding node from the third value that is equal to the maximum value. Under such circumstances, the control means are adapted to determine the second value by subtracting the local value introduced by the node in question from the first value as received, and to replace the first value with the second value when the result of the comparison is greater than the threshold;

the control means may be adapted to proceed with generating an error message when the result of the subtraction is less than the threshold;

when the network is a label switching network and the connection is to be set up in a context of the L2 LSP type, the first value and the third value may be dedicated attribute values of the label switching path of the setup message. In a first variant, the first value and the third value may be values complying with a tag, length, value (TLV) type dedicated format for the SENDER_TSPEC attribute of the setup message. The first value is then accompanied by an exception flag allowing it to be replaced locally. In a second variant, the first value and the third value may be the values of dedicated objects in a quality-of-service (QoS) field of the setup message;

the control means may be adapted to generate "PathError" type error messages;

at least some of the setup messages may include at least two first values representative respectively of the sum from the beginning of the connection that to be set up of the local values of two additive parameters introduced in each preceding node. Under such circumstances, the control means are adapted to determine a second value for each first value as a function of said first value and of the corresponding local value introduced by the node in question, and then to compare each second value with a selected corresponding threshold so as to determine whether the connection in the node in question can accept the maximum values of the additive parameters, and to replace each first value received in the message with each determined second value, at least when the connection can accept each maximum value; and each additive parameter may be selected from at least transmission delay and jitter.

The invention also provides a node of the type constituting an element of a label switching level 2 network, for an Ethernet communications network having a GMPLS control plan and using label switching, the node being fitted with a control device of the type presented above.

BRIEF DESCRIPTION OF THE DRAWINGS

Other characteristics and advantages of the invention appear on examining the following detailed description and the accompanying drawing, in which the sole FIGURE is a highly diagrammatic representation of an example of a label switching communications network having a multiplicity of label edge routers (LERs) and of label core routers (LCRs) that are coupled together, and each of which is fitted with a control device of the invention. The accompanying drawing can be used not only to contribute to the description of the invention, but also to contribute to defining the invention, where appropriate.

DETAILED DESCRIPTION OF THE INVENTION

The invention seeks to make it possible to verify that at least one parameter of a connection that is to be set up within a communications network presents a value referred to as a "maximum value" that is less than or equal to the top limit of a predefined range of values.

Below, it is assumed that the communications network is of the label switched network type, and more precisely that it is constituted by an Ethernet type layer-2 network having a GMPLS type control plan applied thereto. This type of network is defined in particular in the following IETF standards: RFC 3471, RFC 3473, and RFC 3477. Still more precisely, it is assumed below that the GMPLS control plan Ethernet network enables connections to be set up in an L2 LSP type context.

As shown diagrammatically in the sole FIGURE, an Ethernet network with a GMPLS control plan (referred to below as a "GMPLS network") generally comprises a multiplicity of network elements defining nodes, such as label-switched routers (LSRs) that are coupled to one another.

These LSR nodes may be grouped into two categories: label edge routers LERn and label core routers LCRm. The LERn nodes serve to set up connection paths (also referred to as label-switched paths (LSPs)) within the network, while the LCRm nodes perform switching.

In the example shown, the network has five (n=5) LERn nodes, but the index n could have any value greater than or equal to 2, and the network shown has four (n=4) LCRm nodes, but the index m could take any value greater than or equal to 1.

Furthermore, the term "link" is used below to mean a connection between two LSR nodes. It is important to observe that two neighboring nodes may be linked together by a physical transmission link, whereas a connection interconnects two nodes that are not necessarily neighboring.

The term "connection path" is used herein to mean a path between a source LER node and a destination LER node, defined by a sequence of links set up between pairs of LSR nodes, or, and this amounts to the same concept, as defined by an ordered sequence of nodes. Connection paths are generally calculated in such a manner as to optimize traffic transmission (or streams) between a source LER node (e.g. LER1) and a destination LER node (e.g. LER3). In a GMPLS network, each LER node is arranged, when it constitutes a source, in such a manner as to calculate the best connection path for transferring the data streams it receives to the destination LER node, given the service associated with the stream, the current topology of the network, and the current loading of the links.

Furthermore, user or business terminals Ti (in this case i=1 to 4) belonging to clients of the network can make connections to at least some of the LER nodes so as to exchange data between one another over optionally predefined L2 LSP connections.

In addition, the GMPLS network has a network management system (NMS) adapted to transmit data to the LSR nodes and to extract data therefrom in order to enable the network to be managed by its administrator (or manager).

The invention relates to the connection setup stage. More precisely, it relates to the stage during which a connection setup message is transmitted between LSR nodes (LERn and LCRm) on a connection path.

For this purpose, the invention proposes including a control device D preferably in each LSR node of the network, regardless of whether it is an edge router LERn or a core router LCRm, the control device D serving to verify whether a connection that is to be set up, as defined by a connection path passing through the node in which the device is located, does not exceed (i.e. can accept) in said node at least one maximum value for an additive parameter contained in a received connection setup message (referred to below as a "message" for short). This maximum value is less than or equal to the value defining the top limit of the range of values in which a connection parameter must lie.

Each message includes at least one (first) value V1 representative of an additive parameter such as, for example, transmission delay, or jitter. Naturally, the message may include a plurality of values representative of a plurality of additive parameters. Furthermore, each message generally includes other connection parameter values that are not additive, and that also need to be verified locally, with this being done conventionally by the control device D or by any other additional device.

It is assumed below that each (core connection) message received by a node on a connection path includes at least one (first) value V1 representative of jitter, and more precisely the sum since the start of the connection that is to be set up of the local jitter values as introduced in each of the preceding nodes along said connection path.

It is also considered below, by way of non-limiting example, that the connection path is defined by the following ordered sequence of nodes: LER1, LCR1, LCR2, LCR3, and LER3. In addition, the control device D described below is the device located in the core node LCR3. However the devices D located in the other nodes (network elements) operate in the same manner.

The control device D comprises a control module MC serving, each time its node LCR3 receives a message containing a first value V1, to determine a second value V2 that is a function of said first value and of the local value introduced by the output interface of its own node LCR3 that is dedicated to the connection to be set up, and then to compare said second value with a selected threshold in such a manner as to determine whether the connection can accept (does not exceed) some maximum value for jitter in said node LCR3, and to replace the first value in the received message with the second value as determined, at least when the connection can accept said maximum value at the node LCR3 (i.e. the maximum value does not exceed the threshold).

Preferably, the control module MC also serves to generate an error message when the connection to be set up cannot accept the maximum value for jitter at the node. When a message is to be set up in the LS LSP context, the error message can be of the "PathError" type, for example. Such a message is described in particular in the document "Generalized MPLS (GMPLS) RSVP-TE signaling in support of layer-2 label switched paths (L2 LSP)", by P. Papadimitriou et al., that is available on the Internet at the address http://www.ietf.org/internet-drafts/draft-papadimitriou-ccamp-gmpls-l2sc-lsp-02.txt.

At least two implementations of the invention can be envisaged.

A first implementation consists in integrating in the message a third value V3 that is equal to the selected threshold, and a first value V1 that is equal to the sum from the start of the connection to be set up (in this case from LER1) of the local values of jitter as introduced in each node on the connection path preceding the node LCR3, i.e. LER1, LCR1, and LCR2.

In this first implementation, the third value V3 is thus the maximum jitter value that the connection to be set up is to present over its entire connection path, i.e. end-to-end.

Furthermore, in this first example, the first value $V1(i)$ contained in the message received by the node located in position i on a connection path is defined by the following relationship:

$$V1(i) = \sum_{1}^{i-1} P_{loc}(j)$$

where $P_{loc}(j)$ represents the local value of the jitter as introduced by the node located at position j (j=1 to i−1) along said connection path.

For example, with reference to node LCR3, the index i is equal to 4 and $V1(4) = P_{loc}(1)+P_{loc}(2)+P_{loc}(3)$, where $P_{loc}(1)$ is the local value of the jitter introduced by the edge node LER1, $P_{loc}(2)$ is the local value of the jitter introduced by the core node LCR1, and $P_{loc}(3)$ is the local value of the jitter introduced by the core node LCR2. It can be seen that with this notation, the node placed in position i−1 transmits a first value $V1(i)$ to the following node placed in position i.

The second value $V2(i)$ determined by the calculation module MC in the node located in position i along the connection path, is in this case equal to the sum of the first value $V1(i)$ it receives plus the local value $P_{loc}(j=i)$ introduced by the output interface of said node located in position i. For example, for the node LCR3, the index i is equal to 4 and $V2(4)=V1(4)+P_{loc}(4)$.

The control module MC of the node located in position i is adapted to compare each second value $V2(i)$ that it determines with the third value V3 that it receives in the message and that is equal to the threshold. To do this, it can for example subtract the second value $V2(i)$ as determined by itself from the third value V3.

If the result of this subtraction is less than zero ($V3-V2(i) <0$), that means that the connection to be set up can no longer accept the maximum value for jitter on leaving the node placed in position i along the connection path, where the maximum acceptable value is defined by the threshold V3. The control module MC thus sends an error message to the node originating the connection (in this case LER1), e.g. a message of the PathError type, indicating that the connection to be set up cannot accept the maximum value for jitter.

Otherwise, if the result of the subtraction is greater than or equal to 0 ($V3-V2(i)>0$), that means that the connection to be set up can still accept the maximum value for jitter on leaving the node located in position i along the connection path, where the maximum acceptable value is defined by the threshold V3. The control module MC then replaces the value $V1(i)$ as contained in the received message by the second value $V2(i)$ that it has determined, and that becomes the new first value $V1(i+1)$ for the node located in position i+1 along the connection path.

A second implementation consists in taking a threshold equal to zero and in including a first value $V1(i)$ in the message transmitted by a node located at position i along a connection path, where the first value $V1(i)$ is equal to the result of subtracting the sum since the start of the connection to be set up of the local values for jitter $P_{loc}(i)$ as introduced by the outlet interface of each node preceding said node in position i along said connection path from the maximum acceptable value for jitter over the entire connection as given by a third value V3'. This first value $V1(i)$ as received is thus defined by the following relationship:

$$V1(i) = V3' - \sum_{1}^{i-1} P_{loc}(j)$$

It will be observed that with this notation, the node located in position i−1 transmits a first value $V1(i)$ to the following node located in position i. The first value $V1(i)$ that is transmitted in the connection setup message by the node placed in position i−1 thus represents the total value of the additive parameter (in this case jitter) that remains available for the connection to be set up between the node located in position i and the destination node.

By way of example, for node LCR3, the index i is equal to 4 and $V1(3)=V3'-(P_{loc}(1)+P_{loc}(2)+P_{loc}(3))$, where $P_{loc}(1)$ is the local value of the jitter introduced by the edge node LER1, $P_{loc}(2)$ is the local value of the jitter introduced by the core node LCR1, and $P_{loc}(3)$ is the local value of the jitter introduced by the core node LCR2.

In this case, the second value $V2(i)$, determined by the calculation module MC in the node located in position i along the connection path is the result of subtracting the local value $P_{loc}(j=i)$ introduced by the outlet interface of said node located in position i from the first value $V1(i)$ as received. For example, with node LCR3, i is equal to 4 and $V2(4)=V1(4)-P_{loc}(4)$.

In this example, the control module MC of the node located in position i serves to compare the second value $V2(i)$ that it has determined and that is equal to the result of the above-specified subtraction ($V2(i)=V1(i)-P_{loc}(i)$), with the value zero (0) that is used as the comparison threshold.

If the result of this comparison is less than zero ($V2(i)<0$), that means that the connection to be set up can no longer accept the maximum value, as defined by the third value $V3'$, for the jitter at the outlet from the node located in position i along the connection path. The control module MC therefore generates an error message for sending to the node originating the connection (in this case LER1), e.g. a message of the PathError type, indicating that the connection to be set up cannot accept the maximum value for jitter.

Otherwise, i.e. if the result of the comparison is greater than or equal to zero ($V2(i) \geqq 0$), that means that the connection to be set up can still accept the maximum value, as defined by the threshold $V3'$, for the jitter at the outlet from the node located in position i along the connection path. The control module MC then replaces the first value $V1(i)$ that was contained in the received message with the second value $V2(i)$ that it has determined and that becomes the new first value $V1(i+1)$ for the node located in position i+1 along the connection path.

It is important to observe that in the presence of connection setup messages comprising a plurality (k) (at least two) of first values $V1_k(i)$ representative respectively of the sum since the start of the connection to be set up of the local values for different additive parameters $P_{loc\ k}(j)$, as introduced by each preceding node (j=1 to i−1), the control module MC in the node located in position i determines a second value $V2_k(i)$ for each first value $V1_k(i)$ as a function of said first value $V1_k(i)$ and the corresponding local value $P_{loc\ k}(j=i)$ as introduced by said node located in position i. Then, as mentioned above, the control module MC compares each second value $V2_k(i)$ with the selected corresponding threshold ($V3$ or 0) in order to determine whether the connection can accept at its own node the maximum values for the additive parameters. Thereafter, either the control module MC replaces each received first value $V1_k(i)$ in the received message with the corresponding determined second value $V2_k(i)$, at least when the connection can accept each of the maximum values, or else it generates an error message for sending to the node originating the connection (in this case LER1), e.g. a message of the PathError type, when the connection to be set up cannot accept at least one of the maximum values that it has determined for the additive parameters.

Each value ($V1(i)$ (or $V1_k(i)$)) and possibly also $V3$ (or $V3_k$)) can be integrated in a connection setup message in at least three different ways.

A first way consists in integrating the first value $V1(i)$ and possibly also the third value $V3$ in the message that is transmitted from node to node in the form of values for different dedicated LSP attributes.

A second way consists in integrating the first value $V1(i)$ and possibly the third value $V3(i)$ in the message that is transmitted from node to node in the form of values of an attribute, preferably SENDER_TSPEC complying with a dedicated format of the tag, length, value (TLV) type. Under such circumstances, the first value $V1(i)$ that is updated by the control module MC by being replaced by the second value $V2(i)$ as determined thereby, is accompanied by an exception flag allowing it to be replaced locally. It should be recalled that the SENDER_TSPEC attribute is a read-only attribute and that it is therefore necessary to accompany it by an exception flag in order to enable it not only to be read by the control module MC, but also to be updated thereby (by being replaced).

A third way consists in integrating the first value $V1(i)$ and possibly the third value $V3$ in the message that is transmitted from node to node in the form of dedicated object values of a QoS field of the setup message.

The control device D of the invention, and in particular it control module MC, can be implemented in the form of electronic circuits, software modules, or a combination of circuits and software.

The invention is not restricted to the embodiments of the control device and node as described above merely by way of example, but covers any variants that the person skilled in the art can envisage within the ambit of the following claims.

What is claimed is:

1. A control device for a node in an Ethernet communications network having a GMPLS control plan and through which node a connection for setting up is to pass, the device being characterized in that it comprises:

control means arranged, in the event of said node receiving a connection setup message containing at least one first value representative of a sum since a beginning of said connection for setting up of local values of an additive parameter as introduced in each of the preceding nodes in said connection, to;

determine a second value that is a function of said first value and of the local value as introduced by said node, compare said second value with a selected threshold so as to determine whether said connection can accept a maximum value for said additive parameter at said node, and replace said first value in said received message with said second value as determined, at least when said connection can accept said maximum value.

2. A device according to claim 1, characterized in that said control means (MC) are arranged, when said connection cannot accept said maximum value, to generate an error message indicating that said connection to be set up cannot present said maximum value of the additive parameter.

3. A device according to claim 1, characterized in that said setup message includes a third value equal to said selected threshold, and said first value is equal to the sum from the start of said connection to be set up of the local values of said additive parameter as introduced in each of the preceding nodes of said connection.

4. A device according to claim 3, characterized in that said control means (MC) are arranged to subtract said second value from said third value and to proceed with said replacement when the result of said subtraction is greater than or equal to zero.

5. A device according to claim 2, characterized in that said setup message includes a third value equal to said selected threshold, and said first value is equal to the sum from the start of said connection to be set up of the local values of said additive parameter as introduced in each of the preceding nodes of said connection, and further characterized in that said control means (MC) are arranged to subtract said second value from said third value and to proceed with generating said error message when the result of said subtraction is less than zero.

6. A device according to claim 1, characterized in that said threshold is equal to zero, in that said first value is equal to the result of subtracting the sum from the beginning of said connection to be set up of the local values of said additive parameter as introduced in each of the preceding nodes of said connection from a third value equal to said maximum value, and in that said control means (MC) are arranged to determine said second value by subtracting said local value as introduced by said node (LCRm, LERn) from said first value as received, and to proceed with said replacement when the result of said comparison is greater than said threshold.

7. A device according to claim 2, characterized in that said threshold is equal to zero, in that said first value is equal to the result of subtracting the sum from the beginning of said connection to be set up of the local values of said additive parameter as introduced in each of the preceding nodes of said connection from a third value equal to said maximum value, and in that said control means (MC) are arranged to determine said second value by subtracting said local value as introduced by said node (LCRm, LERn) from said first value as received, and to proceed with said replacement when the result of said comparison is greater than said threshold, and further characterized in that said control means (MC) are arranged to generate said error message when the result of said subtraction is less than said threshold.

8. A device according to claim 1, characterized in that said network if of the label switched type and said connection is to be set up in an L2 LSP type context, and said first value and said third value are dedicated attribute values of the label switching path of said setup message.

9. A device according to claim 1, characterized in that said network if of the label switched type and said connection is to be set up in an L2 LSP type context, and said first value and said third value are values complying with a dedicated format of the TLV type, for an attribute known as "SENDER_TSPEC" of said setup message, and said first value is accompanied by an exception flag allowing it to be replaced locally.

10. A device according to claim 1, characterized in that said network if of the label switched type and said connection is to be set up in an L2 LSP type context, and said first value and said third value are the values of dedicated objects of a quality-of-service field of said setup message.

11. A device according to claim 2, characterized in that said network if of the label switched type and said connection is to be set up in an L2 LSP type context, and said first value and said third value are dedicated attribute values of the label switching path of said setup message, and further characterized in that said control means (MC) are arranged to generate error messages of the "PathError" type.

12. A device according to claim 1, characterized in that at least some of the setup messages include at least two first values representative of the sums from the start of said connection for setting up of the local values of two additive parameters as introduced in each of the preceding nodes, said control means (MC) being arranged to determine a second value for each first value as a function of said first value and of the corresponding local value as introduced by said node (LCRm, LERn), and then to compare each second value with a corresponding selected threshold in such a manner as to determine whether said connection can accept maximum values for said additive parameters in said node (LCRm, LERn), and to replace each first value in said message with the corresponding determined second value, at least when said connection can accept each of the maximum values.

13. A device according to claim 1, characterized in that each additive value is selected from a group comprising at least transmission delay and jitter.

14. A node (LCRm, LERn) of the type constituting an element of a label switched network for an Ethernet communications network of the label switched type with a GMPLS control plan, the node being characterized in that it includes a control device (D) according to claim 1.

* * * * *